(12) United States Patent
Sutherland

(10) Patent No.: US 7,003,776 B2
(45) Date of Patent: Feb. 21, 2006

(54) SYSTEM AND METHOD FOR OBJECT PERSISTENCE LIFE-CYCLE AND OBJECT CACHING INTEGRATION

(75) Inventor: James Bryce Sutherland, Ottawa (CA)

(73) Assignee: OIC Acquisition I Corporation, Redwood Shores, CA (US)

( * ) Notice: Subject to any disclaimer, the term of this patent is extended or adjusted under 35 U.S.C. 154(b) by 659 days.

(21) Appl. No.: 09/920,787

(22) Filed: Aug. 1, 2001

(65) Prior Publication Data

US 2003/0028682 A1 Feb. 6, 2003

(51) Int. Cl.
*G06F 9/44* (2006.01)
(52) U.S. Cl. .................... 719/315; 719/318; 709/201
(58) Field of Classification Search ............. 719/315, 719/316, 318; 707/201–204, 102, 103 R, 707/103 Y; 709/201
See application file for complete search history.

(56) References Cited

U.S. PATENT DOCUMENTS

| | | | | |
|---|---|---|---|---|
| 5,499,371 A | | 3/1996 | Henninger et al. ......... 395/700 |
| 5,615,362 A | | 3/1997 | Jensen et al. ............. 395/614 |
| 5,706,506 A | | 1/1998 | Jensen et al. ............. 395/614 |
| 6,029,177 A | * | 2/2000 | Sadiq et al. .............. 707/201 |
| 6,078,926 A | | 6/2000 | Jensen et al. ............. 707/103 |
| 6,085,198 A | * | 7/2000 | Skinner et al. ......... 707/103 R |
| 6,101,502 A | | 8/2000 | Heubner et al. ............ 707/103 |
| 6,408,312 B1 | * | 6/2002 | Forthman et al. .......... 707/203 |
| 6,449,624 B1 | * | 9/2002 | Hammack et al. ......... 707/203 |
| 6,591,272 B1 | * | 7/2003 | Williams ................. 707/102 |
| 6,609,133 B1 | * | 8/2003 | Ng et al. ............... 707/103 Y |
| 6,772,178 B1 | * | 8/2004 | Mandal et al. ............ 707/204 |

OTHER PUBLICATIONS

Yang "Change management in object-oriented databases" 1993 IEEE, pp. 238-244.*
Pawlan "Enterprise JavaBeans" 1998, pp. 1-10.*

* cited by examiner

*Primary Examiner*—Meng-Al T. An
*Assistant Examiner*—Van Nguyen
(74) *Attorney, Agent, or Firm*—Park, Vaughan & Fleming LLP

(57) ABSTRACT

A system for integrating object changes occurring to an object in a first object storage system with a second object storage system. The system operates by first receiving from a first object storage systems a notification of an event relating to an object in the first object storage system. The system sets up a representation of the object in a second object storage system in response to the notification and determines object changes made to the object in the first object storage system by using the representation in the second object storage system. Finally, the system determines object changes with the representation in the second storage system.

15 Claims, 13 Drawing Sheets

SYSTEM AND METHOD FOR OBJECT PERSISTENCE LIFE-CYCLE AND OBJECT CACHING INTEGRATION

The present invention generally relates to a system and method for object persistence life-cycle and object caching integration. In particular, the present invention relates to an entity bean persistence life-cycle and object caching integration with a persistence manager.

BACKGROUND OF THE INVENTION

Object model technology is becoming more popular for building enterprise applications. Technologies which employ distributed objects allow client applications running on one computer to use objects on different machines. Objects can be transient, i.e., exist for a short period of time in a type of memory. Objects can also be persistent, i.e., committed to (i.e., stored in) a database. An object that is persistent can be accessed at any time and a system failure will not result in the loss of a persistent object.

Enterprise JavaBeans™ (EJB) is a component architecture for distributed systems. Objects used in an EJB architecture include entity beans. An entity bean represents persistent data. Each entity bean is identified by a primary key. Entity beans may be created, stored, modified and destroyed. The life-cycle of an entity bean begins just before its creation and ends just after its destruction.

Entity beans are persistent and thus may be shared by multiple clients and will survive a system failure or shutdown. Entity beans may have their persistence managed in two different ways: container managed persistence or bean managed persistence. Entity beans may have their attributes changes by transactions.

The EJB Specification of Sun Microsystems, Inc. (the EJB specification), defines a model for persistence for entity beans. Bean managed persistence (BMP) defines a persistence application program interface (API) that gives control over object life-cycle and object caching to the EJB server, and gives basic object persistence to the bean or persistent manager of the bean. Container managed persistence (CMP) gives the EJB server control of object life-cycle, object caching and persistence. An EJB server may also expose a CMP interface to a third party persistence manager, which is a proprietary API of the third party, and may follow the BMP model or may give more control to the persistence manager. The problem is that to provide an advanced object persistence solution (e.g., support for object caching, object change tracking, complex relationships, and inheritance), it is desirable that the persistence manager has control over object life-cycle and caching.

Providing an EJB server integrated CMP solution that gives the persistence manager control of object caching and object life-cycle is a prior solution. The EJB container in CMP can be proprietary of those creates EJB servers. Thus, the EJB container is EJB server dependent. Problems associated with this prior solution include the fact that an integrated CMP solution is not EJB server independent, and requires an extended persistence manager API that gives control over caching and object life-cycle to the persistence manager.

Providing a basic persistence BMP solution where the persistence manager does not have control of object caching and object life-cycle is another prior solution. Problems associate with this prior solution include the fact that a basic BMP solution does not provide support for advanced persistence, including object caching, object change tracking, relationships and inheritance.

Accordingly, there is a need for a way to provide a persistence manager control over the life-cycle of an object, such as entity bean, which is EJB server or other server independent, and that supports advanced persistence including object caching, object change tracking, relationships and inheritance.

SUMMARY OF THE INVENTION

The present invention seeks to overcome one or more of the disadvantages of the prior solutions associated with the integrated CMP solution and the basic BMP solution.

In accordance with one aspect of the invention, a method for integrating object changes occurring to an object in a first object storage system with a second object storage system is provided. The method comprises the steps of receiving from the first object storage system notification of an event relating to an object in the first object storage system, setting up a representation of the object in the second object storage system in response to the notification, determining object changes made to the object in the first object storage system using the representation in the second object storage system, and integrating the determined object changes with the representation in the second storage system.

In accordance with another aspect of the invention, a method for integrating entity bean object changes occurring to an entity bean object in a container with a persistence manager is provided. The container is capable of issuing notifications of events relating to entity bean objects contained therein. The method comprises the steps of receiving from the container notification of an event relating to an entity bean object in the container, setting up a copy of the entity bean object in the persistence manager in response to the container notification, determining object changes made to the entity bean object in the container using the representation in the persistence manager, and integrating the determined entity bean object changes with the copy in the persistence manager.

In accordance with another aspect of the invention, an object change integration system for integrating object changes occurring to an object in a first object storage system with a second object storage system is provided. The object change integration system comprises a notification receiver for receiving from the first object system notification of an event relating an object in the first object storage system, a representation setter for setting up a representation of the object in the second object storage system in response to the notification, a change determination unit for determining object changes made to the object in the first object storage system using the representation in the second object storage system, and an integrator for integrating the determined object changes with the representation in the second storage system.

In accordance with another aspect of the invention, an object change integration system for integrating entity bean object changes occurring to an entity bean object in a container with a persistence manager is provided. The object change integration system comprises a notification receiver for receiving from the container notification of an event relating to an entity bean object in the container, a representation setter for setting up a copy of the entity bean object in the persistence manager in response to the notification, a change determination unit for determining object changes made to the entity bean object in the container using the representation in the persistence manager, and an integrator for integrating the determined entity bean changes with the copy in the persistence manager.

In accordance with another aspect of the invention, a persistence manager connector for integrating object changes occurring to an object in a first object storage system with a second object storage system is provided. The persistence manager connector comprises a notification receiver for receiving from the first object system notification of an event relating to an object in the first object storage system, a representation setting instructor for instructing the second object storage system to set up a representation of the object in response to the notification, a change determination instructor for instructing the second object storage system to determine object changes made to the object in the first object storage system using the representation in the second object storage system, and an integration instructor for instructing the second storage unit to integrate the determined object changes with the representation in the second storage system.

In accordance with another aspect of the invention, a persistence manager connector for integrating entity bean object changes occurring to an entity bean object in a container with a persistence manager is provided. The persistence manager comprises a notification receiver for receiving from the container notification of an event relating to an entity bean object in the container, a representation setting instructor for instructing the second object storage system to set up a copy of the entity bean object in the persistence manager in response to the notification, a change determination instructor for instructing the second object storage system to determine object changes made to the entity bean object in the container using the representation in the persistence manager, and an integration instructor for instructing the second object storage system to integrate the determined entity bean changes with the copy in the persistence manager.

In accordance with another aspect of the invention, computer-readable media for storing instructions or statements for use in the execution in a computer of a method for integrating changes to an object in a first object storage system with a second object storage system is provided. The method comprises the steps of receiving from the first object storage system notification of an event relating to an object in the first object storage system, setting up a representation of the object in the second object storage system in response to the notification, determining the changes made to the object in the first object storage system using the representation in the second object storage system, and integrating the determined changes with the representation in the second storage system.

In accordance with another aspect of the invention, a computer program product for use in the execution in a computer for integrating changes to an object in a first object storage system with a second object storage system is provided. The method comprises the steps of receiving from the first object storage system notification of an event relating to an object in the first object storage system, setting up a representation of the object in the second object storage system in response to the notification, determining the changes made to the object in the first object storage system using the representation in the second object storage system, and integrating the determined changes with the representation in the second storage system.

In accordance with another aspect of the invention, a computer data signal embodied in a carrier wave and representing sequences of instructions which, when executed by a processor, cause the processor to integrate changes to an object in a first object storage system with a second object storage system is provided. The method comprises the steps of receiving from the first object storage system notification of an event relating to an object in the first object storage system, setting up a representation of the object in the second object storage system in response to the notification, determining the changes made to the object in the first object storage system using the representation in the second object storage system, and integrating the determined changes with the representation in the second storage system.

BRIEF DESCRIPTION OF THE DRAWINGS

The invention will be now explained by way of example only and with reference to the following drawings, respectively.

DETAILED DESCRIPTION OF THE PREFERRED EMBODIMENT

The embodiments described below relate to persistent objects and persistent object systems. Objects described below refer to persistent objects. Object and persistent object are used interchangeably below. Thus, object systems, or object storage systems, described below refer to persistent object systems, or persistent object storage systems, respectively. Furthermore, the embodiments described below relate generally to a system and method for object persistence life-cycle and object caching integration.

The term "object persistence life-cycle and object caching integration" includes object change integration from one object storage system with another object storage system. Such object change integration is intended to include changes to a persistent object, including changes to attributes of an object during a transaction, the creation of an object, the deletion of an object, changes of the state of an object, and other changes to an object. The term also refers to changes occurring to an object during a stage in the object's life-cycle. The term may also refer to changes occurring to an object during multiple stages of the object's life-cycle, during transitions between stages in the object's life-cycle, or during the object's entire life-cycle.

Figure 1A:
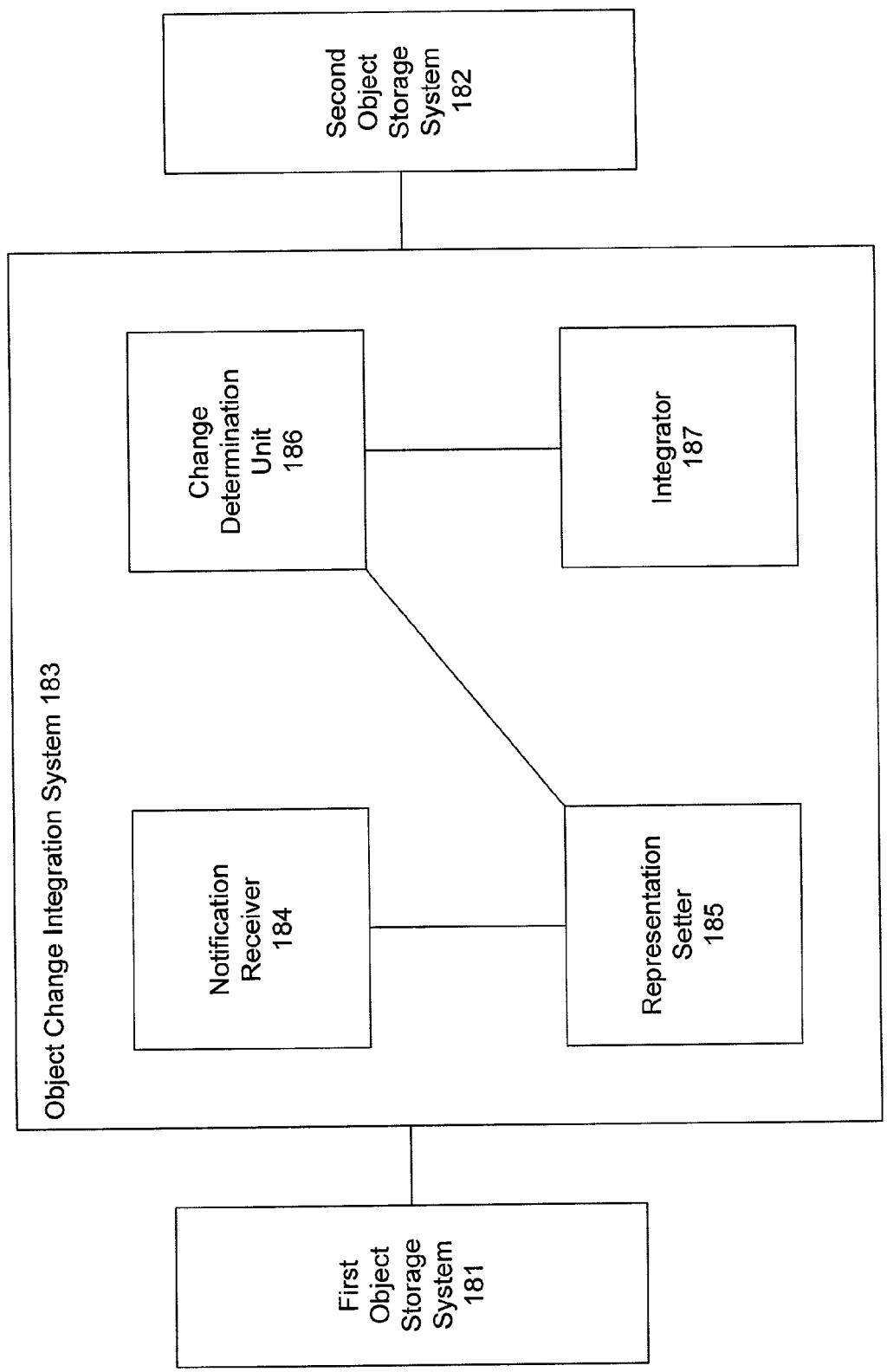
FIG. 1A is an illustration of an example of an object change integration system.

An embodiment of the invention is a system which integrates object change from a persistent object in a first object storage system with a second object storage system. FIG. 1A is an illustration of an example of an object change integration system 183. FIG. 1A shows the object change integration system 183 that communicates with a first object system 181 and a second object system 182. The object change integration system 183 comprises a notification receiver 184, a representation setter 185, a change determination unit 186, and an integrator 187. The notification receiver 184 receives from the first object storage system 181 notification of an event relating to an object in the first object storage system 181. The representation setter 185 sets up a representation of the object in the second object storage system 182 in response to the notification. The change determination unit 186 determines the changes made to the object in the first object storage system 181 using the representation in the second object storage system 182. The integrator 187 integrates the determined changes with the second object storage system 182.

This first object storage system may be an Enterprise JavaBeans (EJB) container and the second object system may be a persistence manager. However, it is not limited to the EJB container or a system using the Java technology. The first object storage system may be any other object storage system that is capable of handling objects temporarily or permanently stored therein and providing notification of events relating to the objects. Such an object storage system may be one developed by Microsoft Corporation or Hewlett Packard.

In an alternative embodiment, the second object system may also be a component of the object change integration system. The object change integration system may also include a rollback notification unit and a rollback provider (not shown). This rollback notification unit may receive a rollback method call from the first object storage system to undo the changes to an object. The rollback provider will undo the changes. A rollback call may be received up until immediately after changes are updated to a database.

Figure 1B:
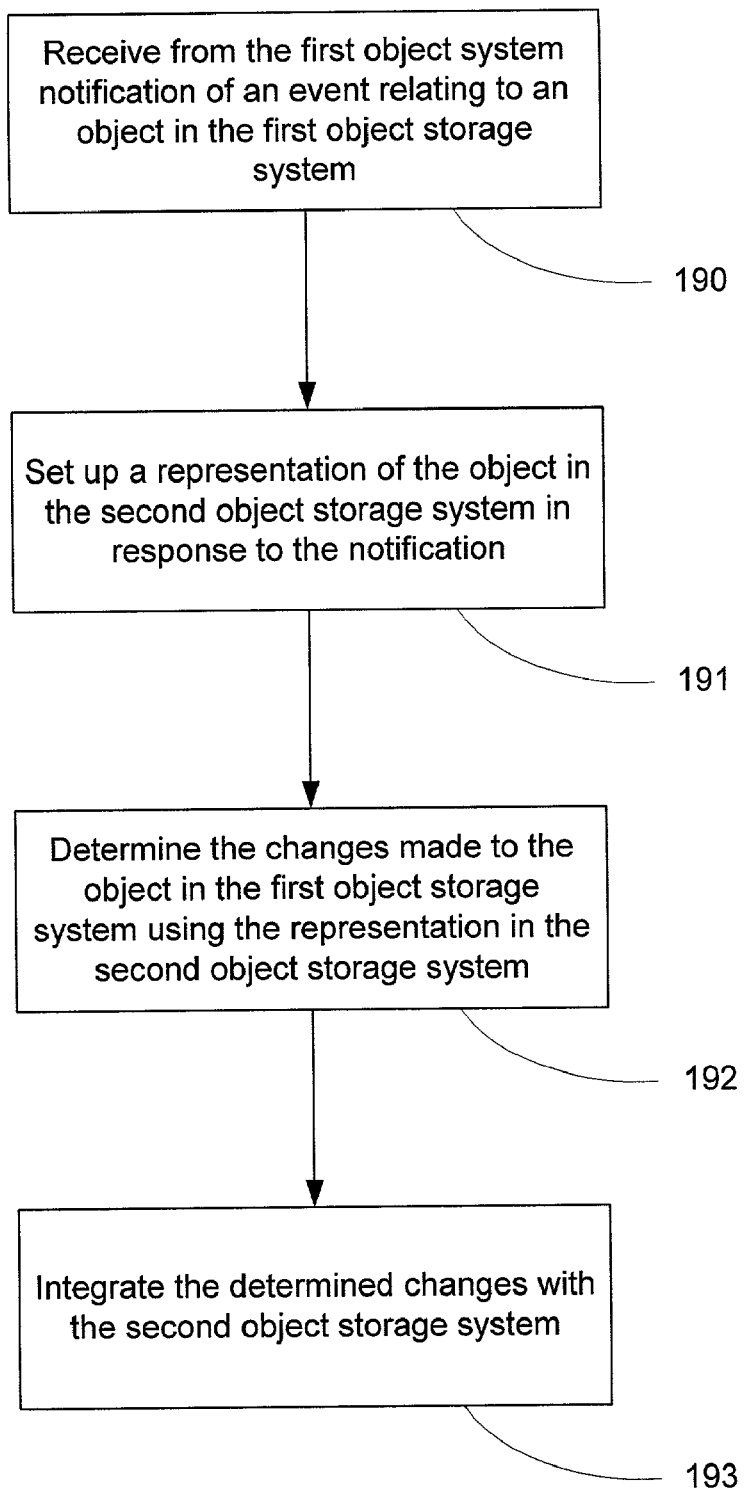
FIG. 1B is a flowchart of a method for integrating object changes.

The operation of the object change integration system is described referring to FIG. 1B. FIG. 1B is a method for integrating object changes. The notification receiver 184 receives from the first object storage system notification of an event relating to an object in the first object system 181 (190). The representation setter 185 sets up a representation of the object in the second object storage system 182 in response to the notification (191). The change determination unit 186 determines the changes made to the object in the first object storage system 181 using the representation in the second object storage system 182 (192). The integrator 187 integrates the determined changes with the second object storage system 182 (193). For example, the notification of an event may be a notification indicating that an object is about changed. The representation of the object may be an original state copy for maintaining the original state of the object. In that case, the change determination unit 186 may determines the changes by comparing the copy in the second object storage system and the changed objects in the first object system. Alternatively or in addition to the original state copy, the representation of the object may include a working copy for reflecting the changes made to the object in the first object storage system. In that case, to determine the changes, the working copy may be compared with the original state copy or a corresponding object which is stored in the second object storage system or obtained from a database. Each step is further described below.

In the receiving step (190), the notification receiver 184 may receive a method call from the first object storage system 181. In the setting up step (191), the representation setter 185 may search for the object in the second storage system 182. If the object is not found in the second storage system 182, representation setter 185 may load a main copy of the object from a database (not shown) into the second object storage system 182 (191). The setting up step (191) may also register a representation of the object in the second storage system 182. This representation may include a working copy and an original state copy.

In the determining step (192), the change determination unit 186 may update the working copy with the changed object from the first object storage system 181 and compare this working copy with the original state copy to determine the changes to the object. The change determination unit 186 may also store the changes to the object in a change storage copy of the object in the second object storage system 182 (192). The object change integration system 183 may register an event listener with the first object storage system 181 to receive notification when a transaction is complete. The integrator 187 may be initiated when the first object storage system 181 notifies the object change integration system 183 that a transaction is complete. The integrator 187 may commit the changed attributes of the object stored in the third (or change storage) copy into a database (193) The integrator 187 may also commit the changed attributes of the object stored in the third copy to the main copy in the second object storage system 182 (193). The object change integration system may also include a rollback notification unit (not shown) as described in the system above. The rollback notification unit may receive a rollback notification as described in the system above, and undo the corresponding actions to the object (not shown).

Another embodiment of the invention is described using bean managed persistence. A person skilled in the art will see that the invention may be similarly applied to container managed persistence with appropriate modifications to a proprietary EJB container.

The invention may be applied to persistent objects in persistent object specifications, such as entity beans in the EBJ specification, having their own life-cycle and object caching system which is not provided to a persistence manager. The following description is of a preferred embodiment by way of example. Specifically, the following description relates to the EJB specification. However, the invention is not limited to an object caching system using the EJB specification. It may be also applicable to other object caching system that is capable of handling objects temporarily or permanently stored therein and providing notification of events relating to the objects.

Figure 1C:
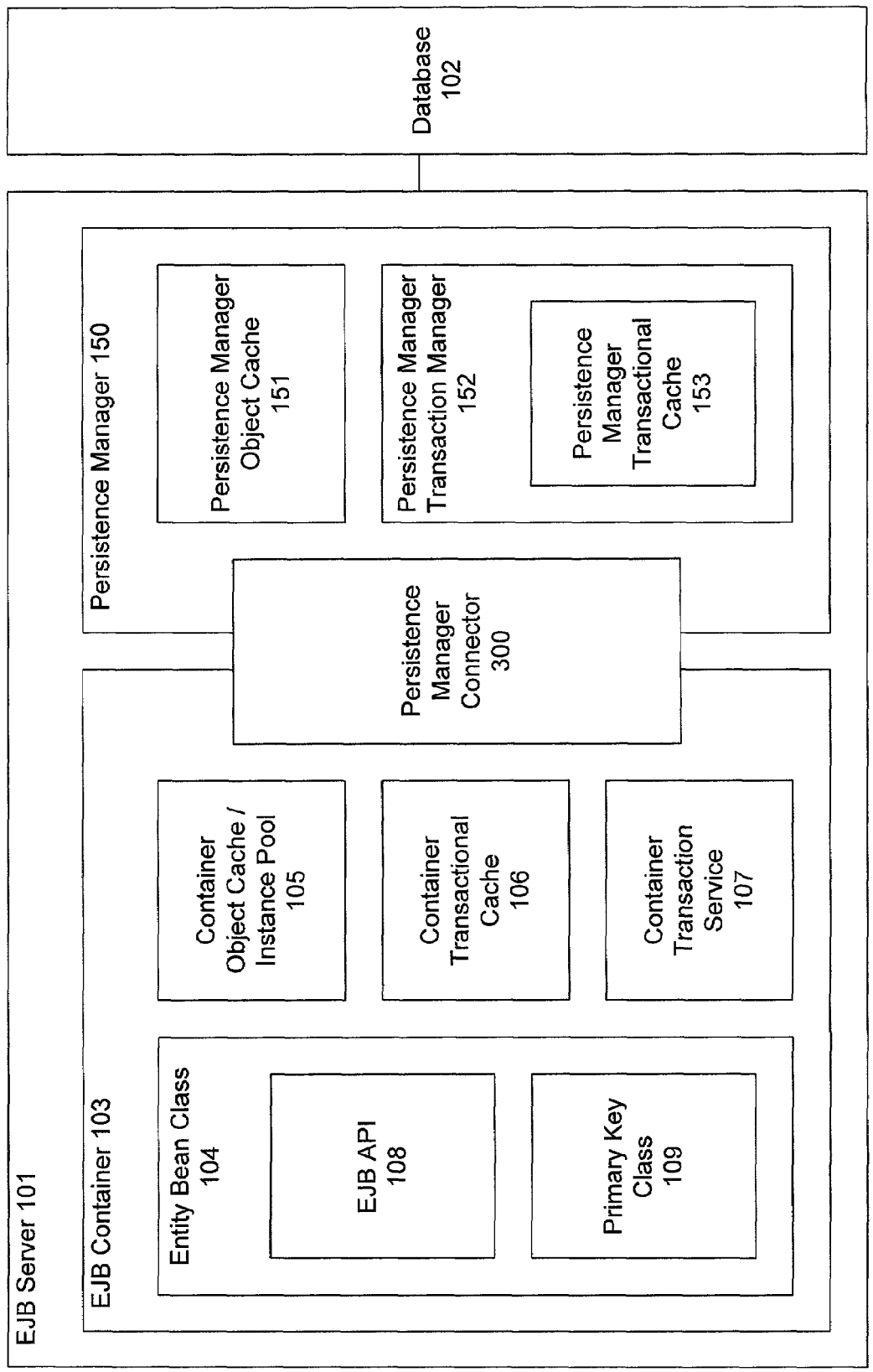
FIG. 1C is an illustration of an example of a persistent object model system.

FIG. 1C illustrates an EJB system which integrates entity bean object change from an EJB container with a persistence manager in accordance with an embodiment of the present invention. The system includes an EJB server 101 and a database 102. The EJB server 101 includes an EJB container 103, a persistence manager 150, and a persistence manager connector 300 providing connectivity between the persistence manager 150 and the EJB container 103. The EJB container 103 includes an entity bean class 104, a container object cache/instance pool 105, a container transactional cache 106, and a container transaction service 107. The entity bean class 104 includes an EJB API 108 and a primary key class 109. The persistence manager 150 includes a persistence manager object cache 151 and a persistence manager transaction manager 152 which includes a persistence manager transactional cache 153.

The persistence manager 150 does not control the object or transactional caching of the EJB container 103. Without special modifications to the EJB API 108, the persistence manager 150 will not have access to any proprietary EJB container 103. Thus, in order to manage the persistence of an entity bean, the persistence manager 150 will have to maintain object and transactional caching independently from the EJB container 103.

The persistence manager connector 300 instructs and controls the persistence manager 150 to maintain its own object cache 151 and persistence life-cycle that is separate but integrated with the EJB server 101 object caching (or container object cache/instance pool 105) and life-cycle. This allows the persistence manager 150 to support object caching, object change tracking, complex relationship and inheritance.

Alternatively, the persistence manager connector 300 may be created as a component of a new persistence manager. In such a scenario, the persistence manager connector 300 would be within the persistence manager 150. Furthermore, a persistence manager 150 may be modified to include the persistence manager connector functionality. The description below will continue with the example as shown in FIG. 1C.

Caching in an EJB server 101 may be implemented in many different ways. One way is to have the EJB server 101 use object caching, i.e., maintain an object cache. Another way is to have the EJB server 101 use transactional caches only. Yet another way is to have the EJB server 101 use object pooling, i.e., maintain a pool of entity bean instances. The persistence manager connector 300 works independently from how an EJB server 101 is implemented. Whether the EJB server 101 uses object caching, transactional caches or object pooling, the persistence manager connector 300 allows the persistence manager 150 to maintain a separate but integrated object cache 151 and object persistence life-cycle.

Figure 2:
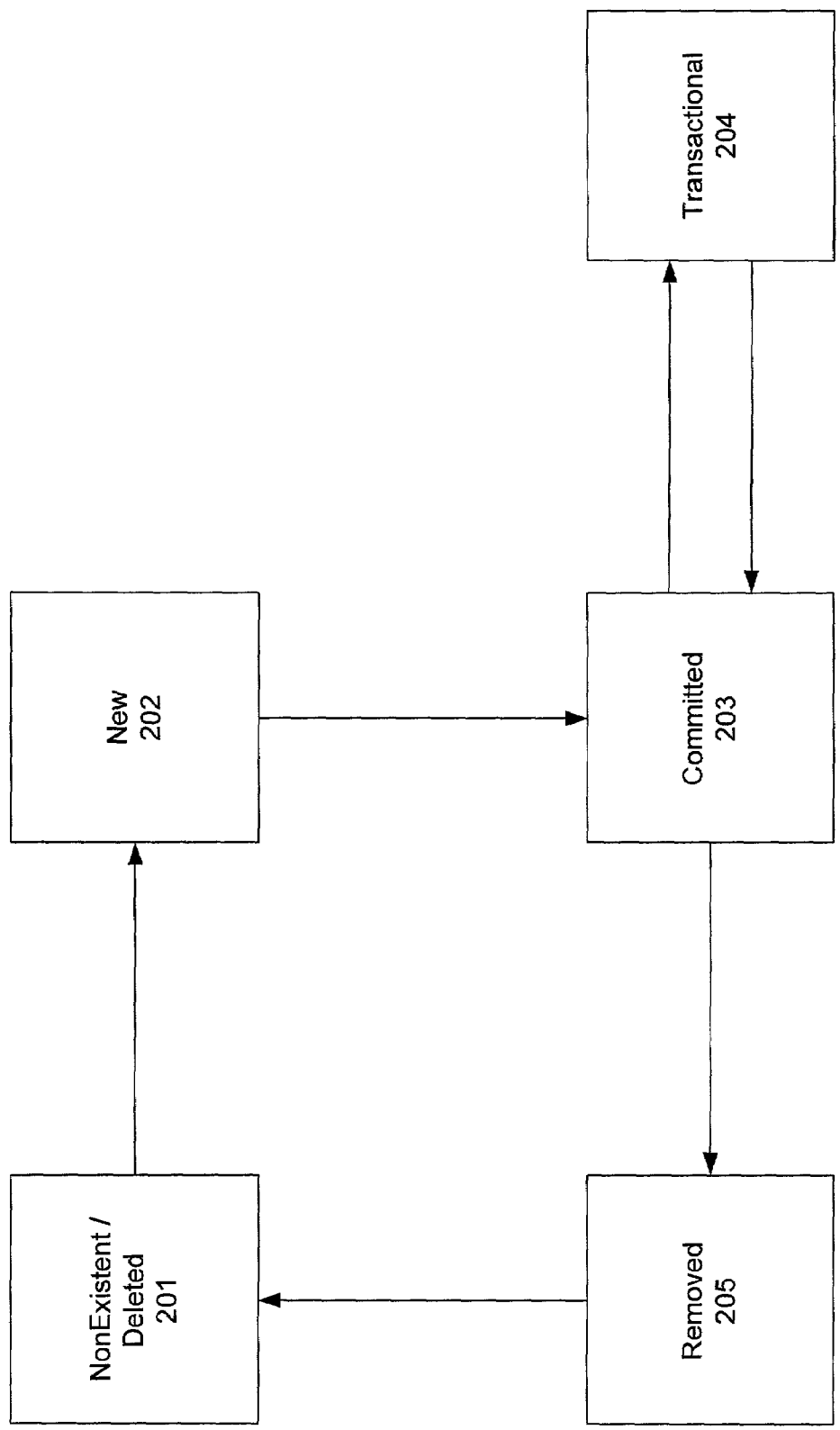
FIG. 2 is an illustration of an example of a persistent object life-cycle model.

FIG. 2 illustrates an entity bean life-cycle. Entity beans are persistent and may exist within a database. An entity bean persistent life-cycle includes the transition between the following states shown in FIG. 2: a non-existent/deleted state 201; a new state 202; a committed state 203; a transactional state 204; and a removed state 205.

Transitions from one state to another can be initiated with callback methods defined in the EJB specification and Java Transactional Service (JTS) as defined in the EJB specification. Callback methods are calls given by the EJB container 103 and intercepted by the persistence manager connector 300. When a caching system does not follow the EJB specification, the connector 300 may use other notification of events indicating events relating to objects. For example, the connector 300 may use a notification that indicates the starting of changing objects, a notification indicating that the changing is about to finish, and/or a notification indicating that the changing is just finished.

An entity bean object moves from the non-existent/deleted state 201 to the new state 202 through a create function. For example, the EJB specification includes the ejbCreate( ) callback which is sent out by the EJB container 103. The new state 202 is an uncommitted transactional state. Objects in this state 202 are not committed in a database. Objects in this state 202 are in the progress of being created and can be found in the persistence manager transactional cache 153.

A beforeCompletion( ) callback, defined in the JTS, may begin an object's transition from the new state 202 to the committed state 203. The committed state 203 is a shared or global state. Objects in the committed state 203 can be in a shared or global cache or in a database. The afterCompletion( ) callback from the JTS may confirm that the object has been committed, say to the database.

A load function will move an object from the committed state 203 to the transactional state 204. For example, the EJB specification includes the ejbLoad( ) callback. Objects in the transactional state 204 may be stored in the persistence manager transactional cache 153. Such objects are in the process of being modified. Objects may move from the transactional state 204 back to the committed state 203 using the JTS beforeCompletion( ) and afterCompletion( ) callbacks.

A remove function will move an object from the committed state to the removed state 205. For example, the EJB specification includes the ejbRemove( ) callback. The removed state 205 is an uncommitted transactional state. Objects in the removed state 205 are in the process of being deleted.

Objects moved from the removed state 205 to the non-existent/deleted state 201 no longer exist in the server, cache or database. The JTS beforeCompletion( ) and afterCompletion( ) callbacks may be used to move objects from the removed state 205 into the non-existent/deleted state 201.

Figure 3:
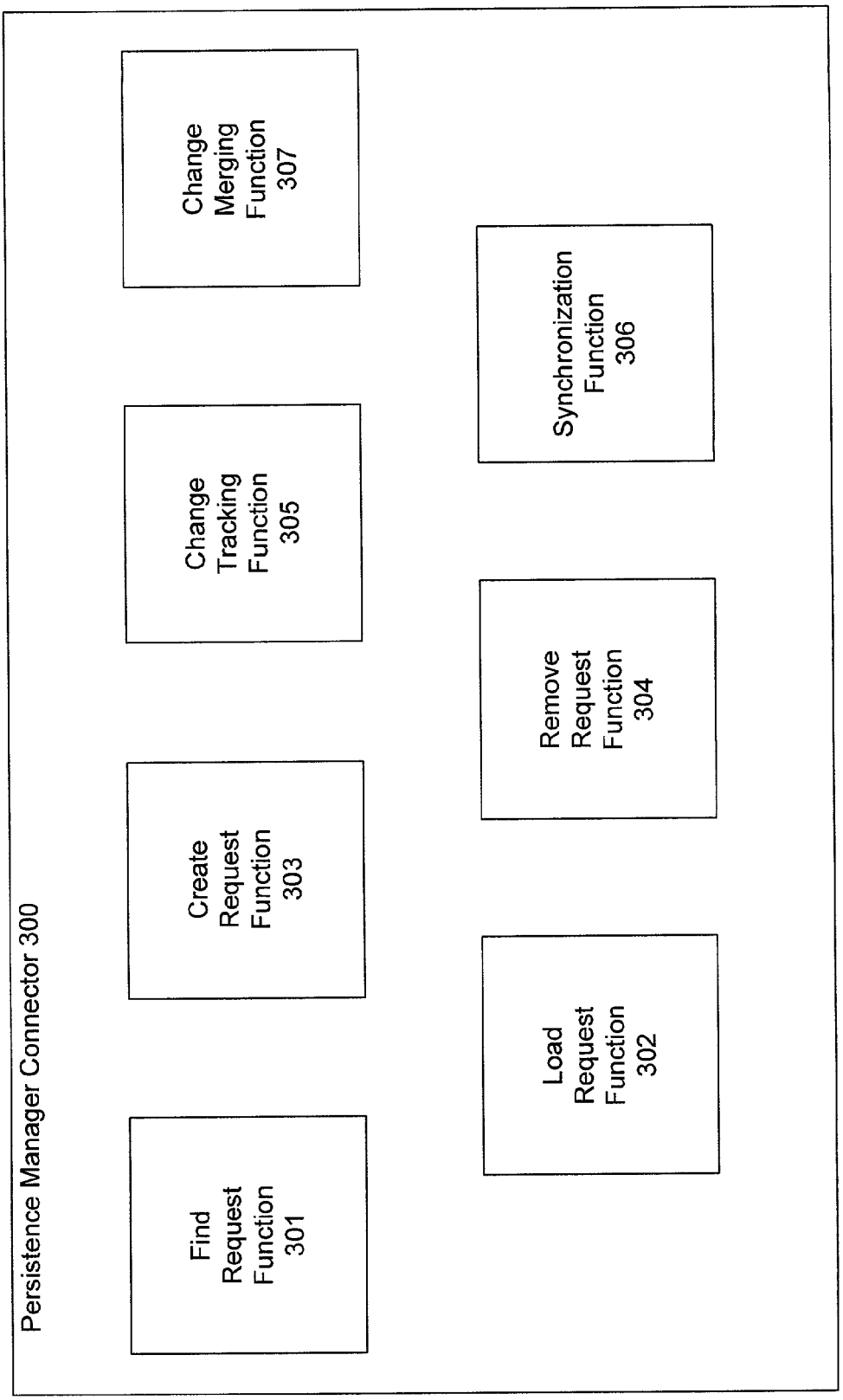
FIG. 3 is an illustration of the persistence manager connector functional model.

FIG. 3 illustrates the functional components of a persistence manager connector 300. The functional components include a find request function 301, a create request function 303, a load request function 302, a change tracking function 305, a remove request function 304, a synchronization function 306, and a change merging function 307. Many of the functional components are initiated after EJB callback methods which are invoked by the EJB container 103. The components deal with entity bean objects in different stages of their persistence life-cycle.

When an EJB container 103 needs to find an entity bean object, the EJB container 103 calls a finder method on the persistence manager connector 300 which initiates the find request function 301. The find request function 301 searches for and loads the resulting objects into the persistence manager object cache 151.

When a method on an entity bean object is invoked in a new transaction context, the EJB container 103 calls a load method on the persistence manager connector 300, which initiates the load request function 302. The load request function 302 copies the information from the respective object in the persistence manager object cache 151 into the object from the container object cache/instance pool 105.

When an entity bean object is to be created, the EJB container 103 calls a create method on the persistence manager connector 300, which initiates the create request function 303. The create request function 303 notifies the persistence manager 150 that, upon successful completion of a transaction, a new object should be inserted on the database 102.

When an entity bean object is to be removed, the method is sent to the EJB container 103. The EJB container 103 calls a remove method on the persistence manager connector 300, which initiates the remove request function 304. The remove request function 304 notifies the persistence manager that, upon successful completion of the transaction, the object should be deleted from the database 102.

During the load function 302, the change tracking (or cloning) function 305 is initiated. The change tracking function 305 provides the ability to track changes to the object instances in the EJB container object cache/instance pool 105. The persistence manager connector 300 needs to know when a transaction is complete in order to update any changes made to the object during the transaction. The synchronization function 306 provides the ability to synchronize with the container (or EJB server) transaction service 107 to obtain transactional callbacks from the container transaction service 107.

When a transaction is complete, the container transaction service 107 notifies the persistence manager connector 300, which initiates the change merging function 307. The change merging function 307 provides the ability to merge changes from the objects in a transactional context in the container object cache/instance pool 105 into the persistence manager transactional cache 153.

Through these functions, the persistence manager connector 300 instructs and controls the persistence manager 150. Referring back to the system described in FIG. 1A, the persistence manager connector 300 provides the same overall functionality as the object change integration system 183. The notification receiver 184 is reflected in the callbacks used to initiate most of the functions in FIG. 3. The representation setter 185 is reflected in the find request function 301, the load request function 302 and the change tracking function 305. The change determination unit 186 is reflected in the change tracking function 305 and the change merging function 307. The Integrator 187 is reflected in the change merging function 307. Each function in FIG. 3 will now be described using flow diagrams.

Figure 4:
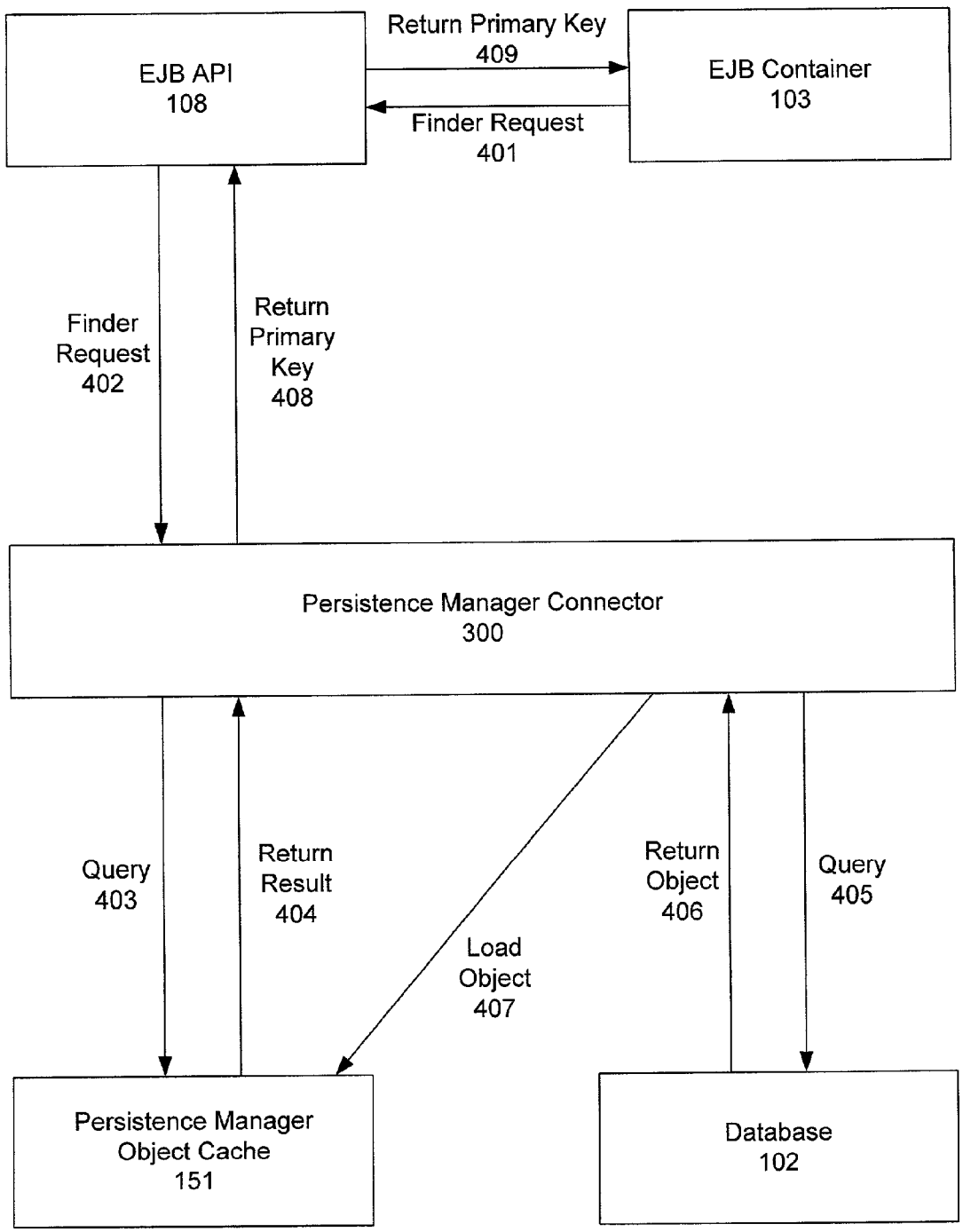
FIG. 4 is a flow diagram of the connector finder request function.

FIG. 4 is a flow diagram which illustrates the finder request function 301. An EJB container 103 sends a finder callback or request to the EJB API 108 (401). If the system is using BMP, then the callback is serviced by the BMP API implemented by the bean class (not shown) in the entity bean class 104. If the system is using CMP, then the callback is serviced by the CMP API implemented by the home class (not shown) in the entity bean class 104. Since the persistence manager connector 300 is persistence management type independent, EJB API 108 will be used in the place of either the BMP API or the CMP API in the following description.

The finder request (401) from the EJB container 103 contains the primary key of the object in the finder request. The EJB API 108 sends its own finder quest (402) with the same primary key. A finder request (402) from the EJB API 108 is intercepted by the persistence manager connector 300 and transformed into a query (403) against the persistence manager 150. The persistence manager connector 300 queries the persistence manager object cache 151 (403) to see if it contains the object. Again, the object primary key is used. If the object being queried is in the persistence manager object cache 151, the primary key of the object is returned (404). Otherwise, the persistence manager connector 300 instructs the persistence manager 150 to query the database 102 (405) in order to obtain the object (406) and load the object into the persistence manager object cache 151 (407). The persistence manager connector 300 instructs the persistence manager 150 to extract the primary key of the object is and return it to the EJB API 108 (408) which in turn returns the primary key to the EJB container 103 (409). Thus, the find request function 301 ensures that an object is in the persistence manager object cache 151.

Figure 5:
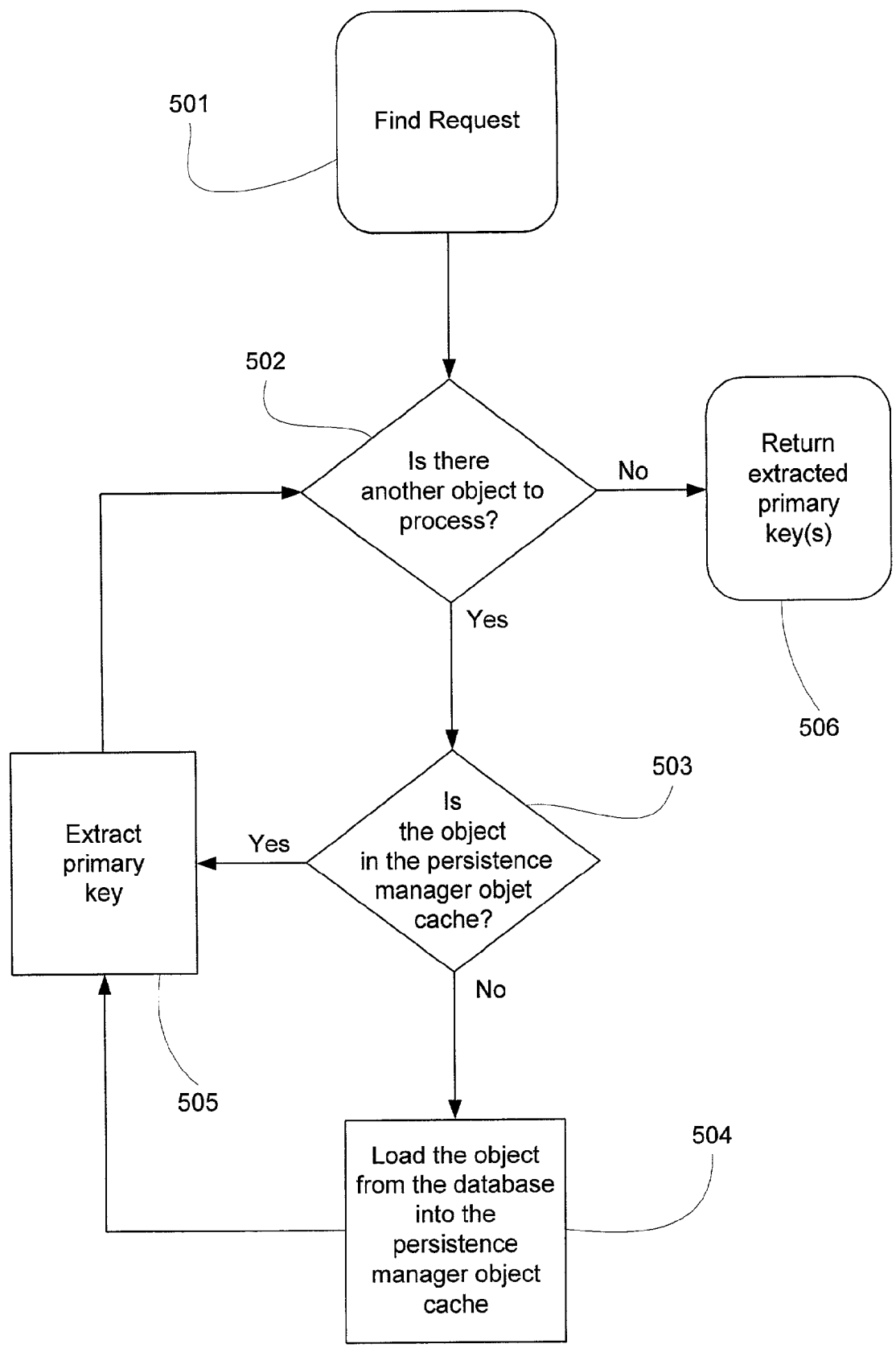
FIG. 5 is a flowchart of the connector finder request function.

More than one object may be the subject of a find request function 301. The find request function 301 can be summarized in the flowchart shown in FIG. 5. The flowchart in FIG. 5 begins after the persistence manager connector 300 intercepts the finder request (402) and ends with the return of the primary key(s) to the EJB API 108 (408). For each object subject to the finder request (501), the following steps are taken (502). If the object is in the persistence manager object cache 151 (503), then the primary key of that object is extracted (504). If the object is not in the persistence manager object cache 151 (503), then the object is loaded from the database 102 to the persistence manager object cache 151 (505). Once the object is known to be in the persistence manager object cache 151, the primary key of the object is extracted (504). Once each object subject to the finder request has been processed (502), then the extracted primary key(s) are returned (506) and the find request function is complete.

Figure 6:
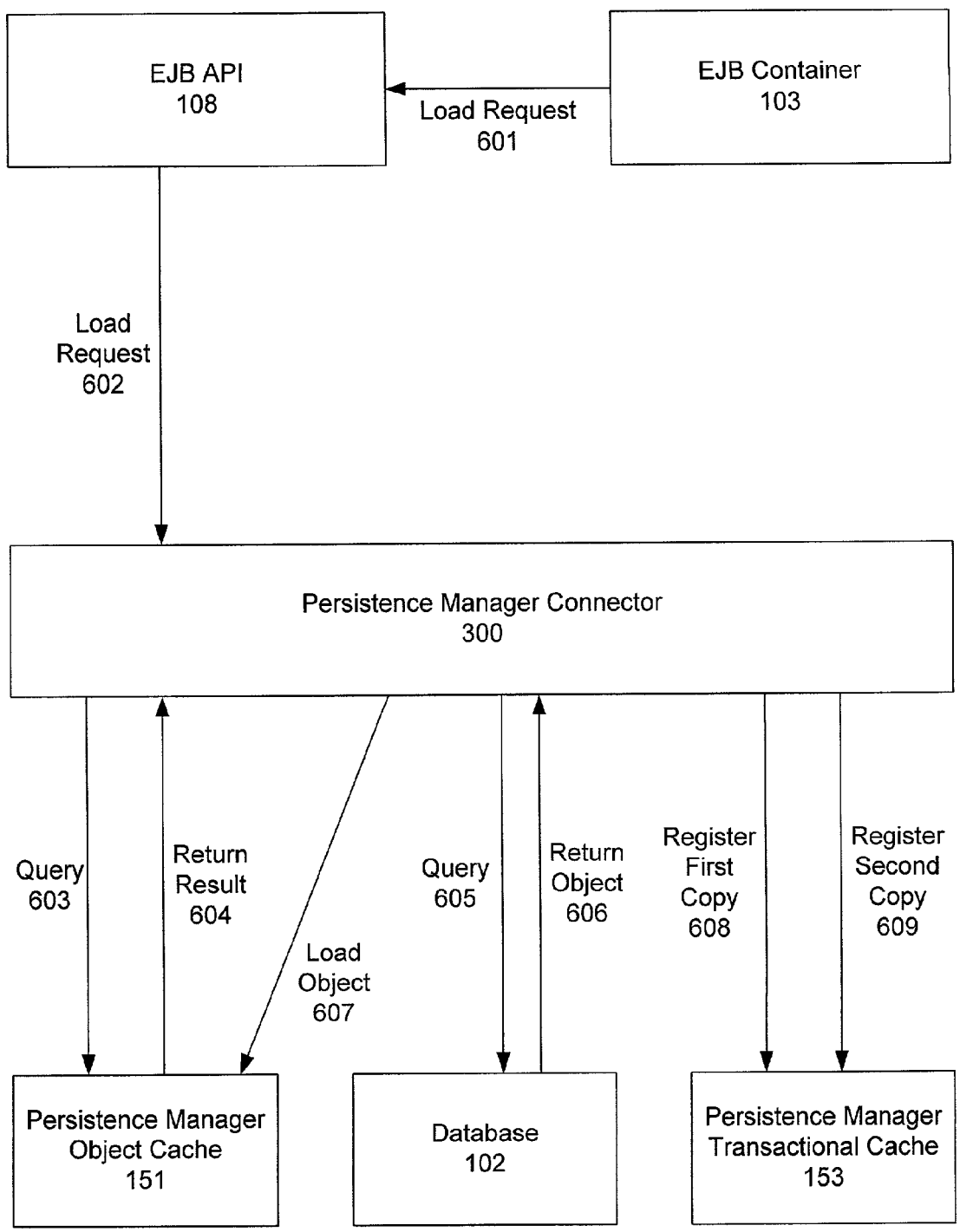
FIG. 6 is a flow diagram of the connector load request function and change tracking function.

FIG. 6 is a flow diagram which illustrates the load request function 302 and the change tracking function 305. An EJB container 103 sends a load callback or request to the EJB API 108 (601). The load callback passes the primary key of the object to be loaded. Again, the persistence manager connector 300 is persistence management type independent and EJB API 108 will be used in the place of either the BMP API or the CMP API in the following description. A load request from the EJB API 108 is intercepted by the persistence manager connector 300 (602).

The persistence manager connector 300 uses the primary key argument from the load request (602) to query if the object is in the persistence manager object cache 151 (603). The result of the query (603) is returned to the persistence manager connector 300 (604). If the object is not found, the persistence manager connector 300 instructs the persistence manager 150 to query the database 102 (605) in order to obtain the object (606) and load the object into the persistence manager object cache 151 (607).

When a transaction is occurring in the container transactional cache 106, the EJB container 103 calls a load callback or request (601). The persistence manager connector 300 intercepts the load callback, or load request (602). During the load request (602), the persistence manager connector 300 asks the container transaction service 107 if the load request is in the context of a transaction (i.e., changes may occur to an object) and if so for the transaction identification. If the EJB container 103 is in the context of a transaction, the persistence manager connector 300 instructs the persistence manager 150 to register the object into the persistent manager transactional cache 153 (608). Thus a first copy, or clone, of the object is present in the persistent manager transactional cache 153.

The persistence manager connector 300 also instructs the persistence manager to register a second copy of the object into the persistence manager transactional cache 153 (609). This second copy is used as a backup copy to allow changes from the first copy to be computed by comparing the first copy with this second copy. Thus, a copy of the original state of the object is recorded. Storing a copy of the original state of the object in the persistence manager transactional cache 153 provides a reference to be compared with changes to the object which will be tracked. These changes will be computed during the commit of the object to the database 102, as described below.

After all changes are computed, a third copy of the object will be created containing the changed attributes of the object. This third copy is used to copy its attributes into the object from the container object cache/instance pool 105 that was the source to the load callback (601). Copying the attributes into the EJB container object from this third copy ensures that all attribute values and relationships are distinct between the EJB container object and the persistence manager object. This is necessary because the EJB container object only lives for the duration of the transaction, where as the persistence manager object is cached across transactions by virtue of the second copy of the object in the persistence manager transactional cache. The purpose served by copying the attributes from the third copy to the EJB container object is to properly handle collections and composite data types to ensure that the values are different between the EJB container object and the second copy of the object in the persistence manager transactional cache 153.

The create request function 303 may be used as part of changes to objects, i.e., an insertion of an object into a database. The created object is recorded in the persistence manager transaction manager 152, to be inserted during the commit of the transaction. Similarly, the remove request function 304 may be used as part of changes to objects, i.e., a deletion of an object from a database. In a remove request function 304, the removed object is recorded in the persistence manager transaction manager 152, to be deleted during the commit of the transaction.

Figure 7:
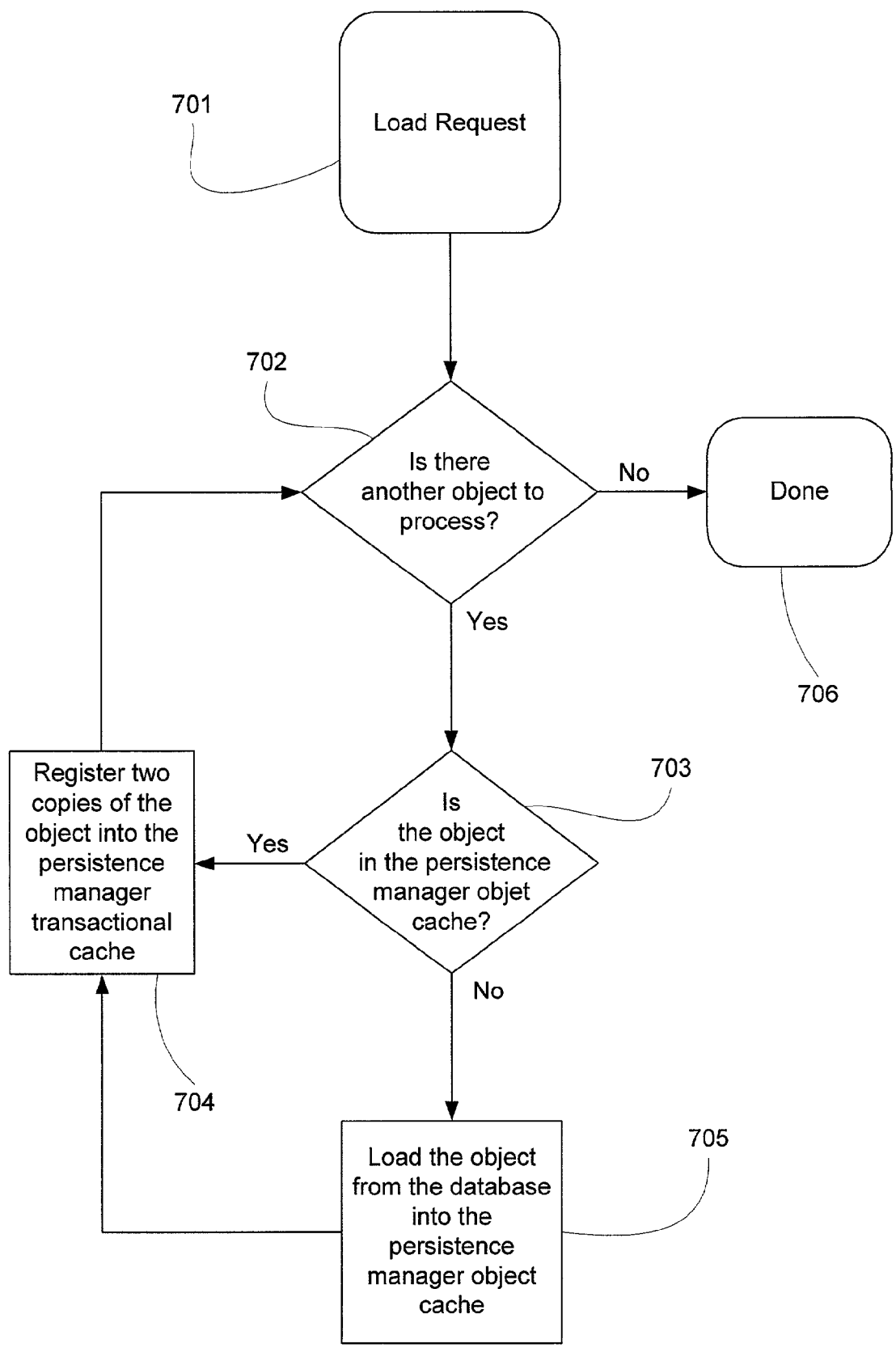
FIG. 7 is a flowchart of the connector load request function and change tracking function.

More than one object may be the subject of a load request function 302 and/or a change tracking function 304. The load request function 302 can be summarized in the flowchart shown in FIG. 7. The flowchart in FIG. 7 begins after the persistence manager connector 300 intercepts the load request (602) and ends with the registration of the second copy of the object into the persistence manager transactional cache 153 (609). For each object subject to the load request (701), the following steps are taken (702). If the object is in the persistence manager object cache 151 (703), then two copies of that object are stored into the persistence manager transactional cache 153 (704). If the object is not in the persistence manager object cache 151 (703), then the object is loaded from the database 102 to the persistence manager object cache 151 (705). Once an object is known to be in the persistence manager object cache 151, two copies of that object are stored into the persistence manager transactional cache 153 (704). Once each object subject to the load request has been processed, then the load request function is complete (706).

Figure 8:
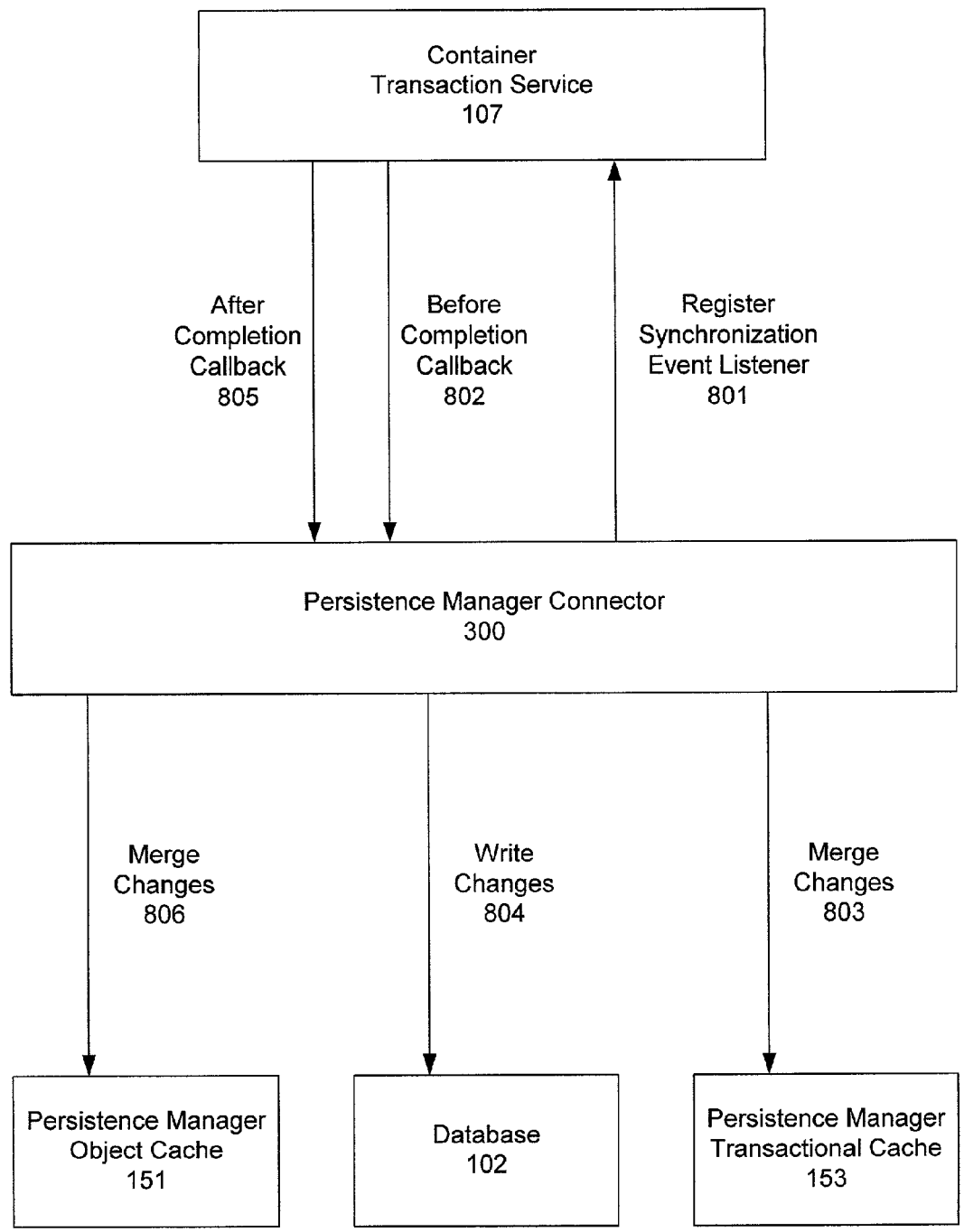
FIG. 8 is a flow diagram of the connector synchronization function and change merging function.

FIG. 8 is a flow diagram which illustrates the synchronization function 306 and the change merging function 307. The persistence manager 150 integrates with the container transaction service 107. The persistence manager connector 300 needs to know when a transaction relating to an entity bean object is complete. To find out, the persistence manager connector 300 registers a synchronization event listener with the container transaction service 107 (801). This synchronization listener receives callbacks from the container transaction service 107 before and after completion of the transaction. The transaction service and synchronization listener are standardized through the JTS specification and the connector 300 may suitably use these services. However, the connector 300 may obtain information about completion of the changes in a different manner, other than using the transaction service and synchronization listener as defined by the JTS specification.

As has been mentioned, the container transaction service 107 informs the persistence manager connector 300 that a transaction is complete with a two step process. First, the connector transaction service 107 sends the persistence manager connector 300 a "before completion" event notification, e.g., the JTS beforeCompletion( ) callback (802). When the before completion callback (802) is received the persistence manager connector 300 iterates over all of the EJB server's objects that are part of the transaction. For each object in the transaction, the persistence manager connector 300 instructs the persistence manager 150 to merge the changes to object in the EJB container 103 into the respective first copy of the object in the transactional cache 153. This is how entity bean object changes are propagated from the EJB container 103 to the persistence manager 150. The persistence manager connector 300 then instructs the persistence manager 150 to compute the change from the EJB server's object (or container's object). That is, the persistence manager connector 300 iterates over all objects registered with the persistence manager transactional cache 153 and instructs the persistence manager 150 to compare each respective first (changed) copy with the corresponding second (original state) copy to determine the changes made to each respective original object and merge them into a third copy of the object in the persistence manager transactional cache 153 (803). The entity bean objects changes are thus tracked using the first copy in the persistence manager transactional cache 153 and computed through a comparison with the second copy in the persistence manager transactional cache 153. The persistence manager connector 300 then instructs the persistence manager 150 to write (i.e., commit) the changes to the objects to the database 102 (804).

The container transaction service 107 then notifies the persistence manager connector 300 through an "after completion" event notification, e.g., the JTS afterCompletion( ) callback. When the after completion callback (805) is received the persistence manager connector 300 iterates over all objects registered with the persistence manager transactional cache 153 and instructs the persistence manager 150 to merge the changes to each object into the persistence manager object cache 151 or shared object cache (806).

Figure 9:
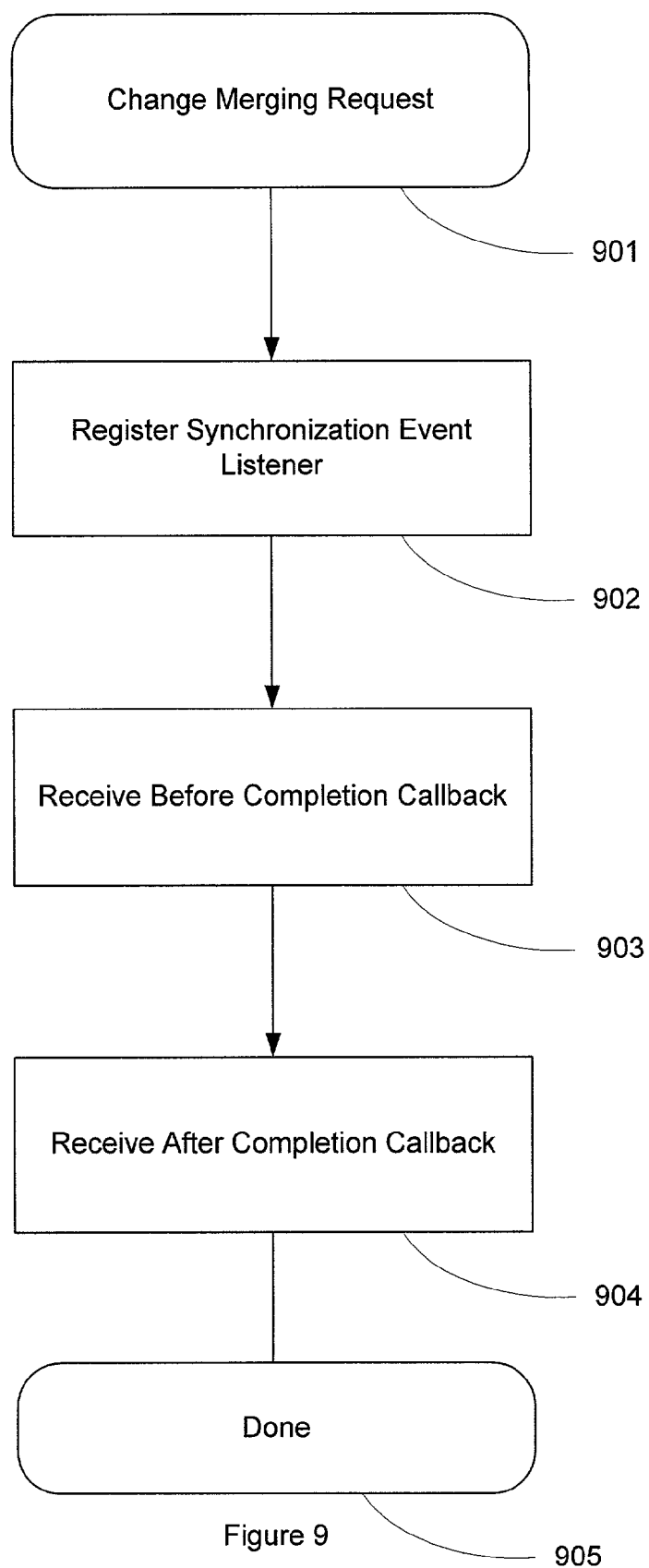
FIG. 9 is a flowchart of the connector synchronization function and change merging function.

More than one object may be the subject of a synchronization function 306 and/or a change merge function 307. These functions can be summarized in the flowchart shown in FIG. 9. In order to perform the change merging request function 307 (901), the persistence manager connector 300 registers a synchronization event listener with the container transaction service 107 (902). After the registration of the synchronization event listener (902), the persistence manager connector 300 waits for an event from the container transaction service 107. Once the transaction is complete, the persistence manager connector 300 may receive a before completion callback from the container transaction service 107 (903). The persistence manager connector 300 will then oversee before completion callback operations summarized in FIG. 10. The persistence manager connector 300 then may receive an after completion callback from the container transaction service 107 (904). The persistence manager connector 300 will then oversee after completion callback operations summarized in FIG. 11. Once the after completion callback operations are completed, the change merging request function is complete (905).

Figure 10:
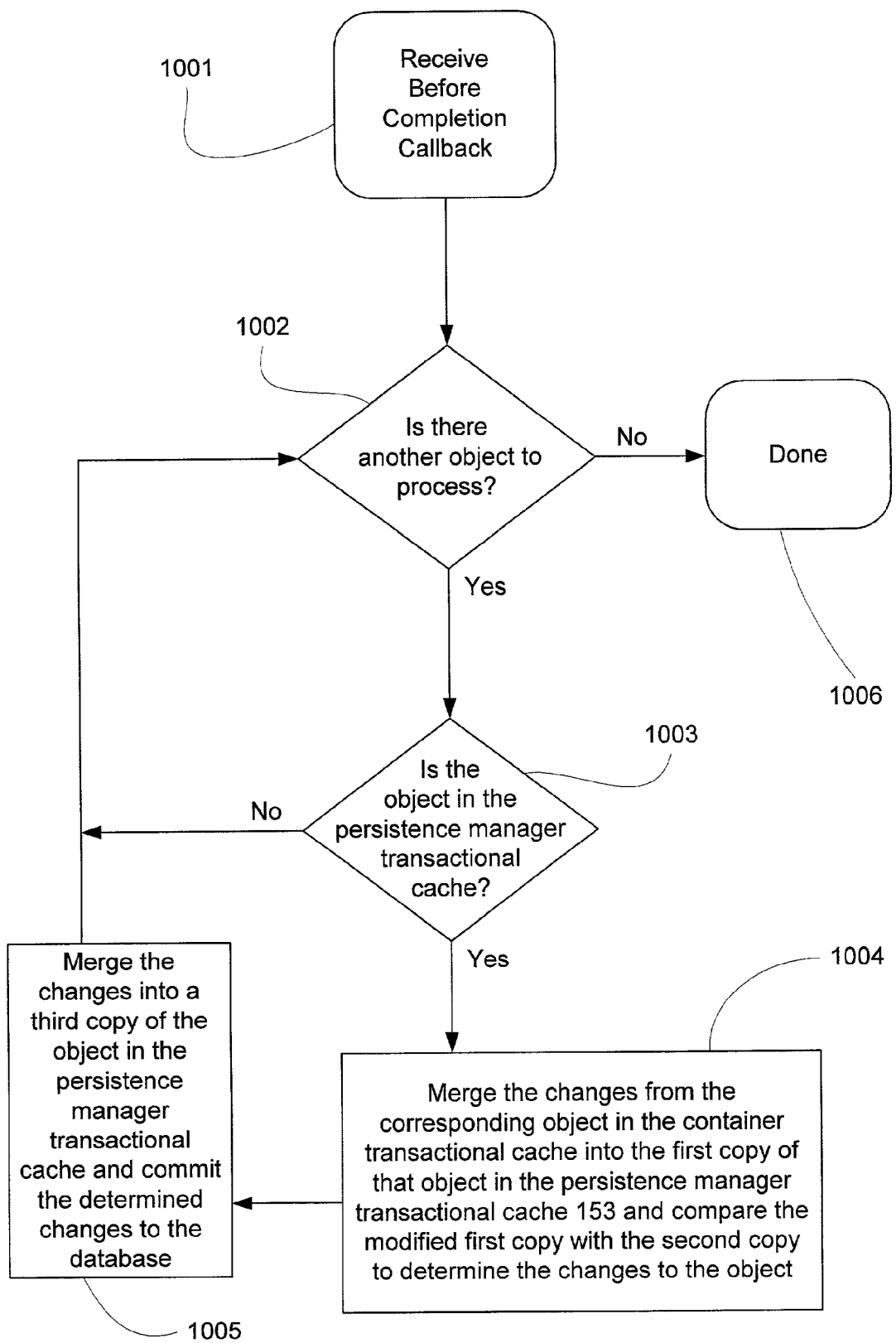
FIG. 10 is a flowchart of the before completion callback operations performed by the connector.

FIG. 10 summarizes the before completion callback operations which the persistence manager connector 300 oversees after receiving a before completion callback (1001). For each object subject to the before completion callback (1001), the following steps are taken (1002). If the object is not in the persistence manager transactional cache 153 (1003), then move on to the next object in the before completion callback (1002). If the object is in the persistence manager transactional cache 153 (1003), then merge the changes from the corresponding object in the container transactional cache 108 into the first copy of that object in the persistence manager transactional cache 153 and compare the modified first copy with the second copy to determine the changes to the object (1004). Once the changes to the object are determined, merge the changes into a third copy of the object in the persistence manager transactional cache 153 and commit the determined changes to the database 102 (1005). Once each object in the before completion callback is processed (1002), the before completion callback operations are complete (1006) and the persistence manager connector 300 waits for an after completion callback from the EJB container 103.

Figure 11:
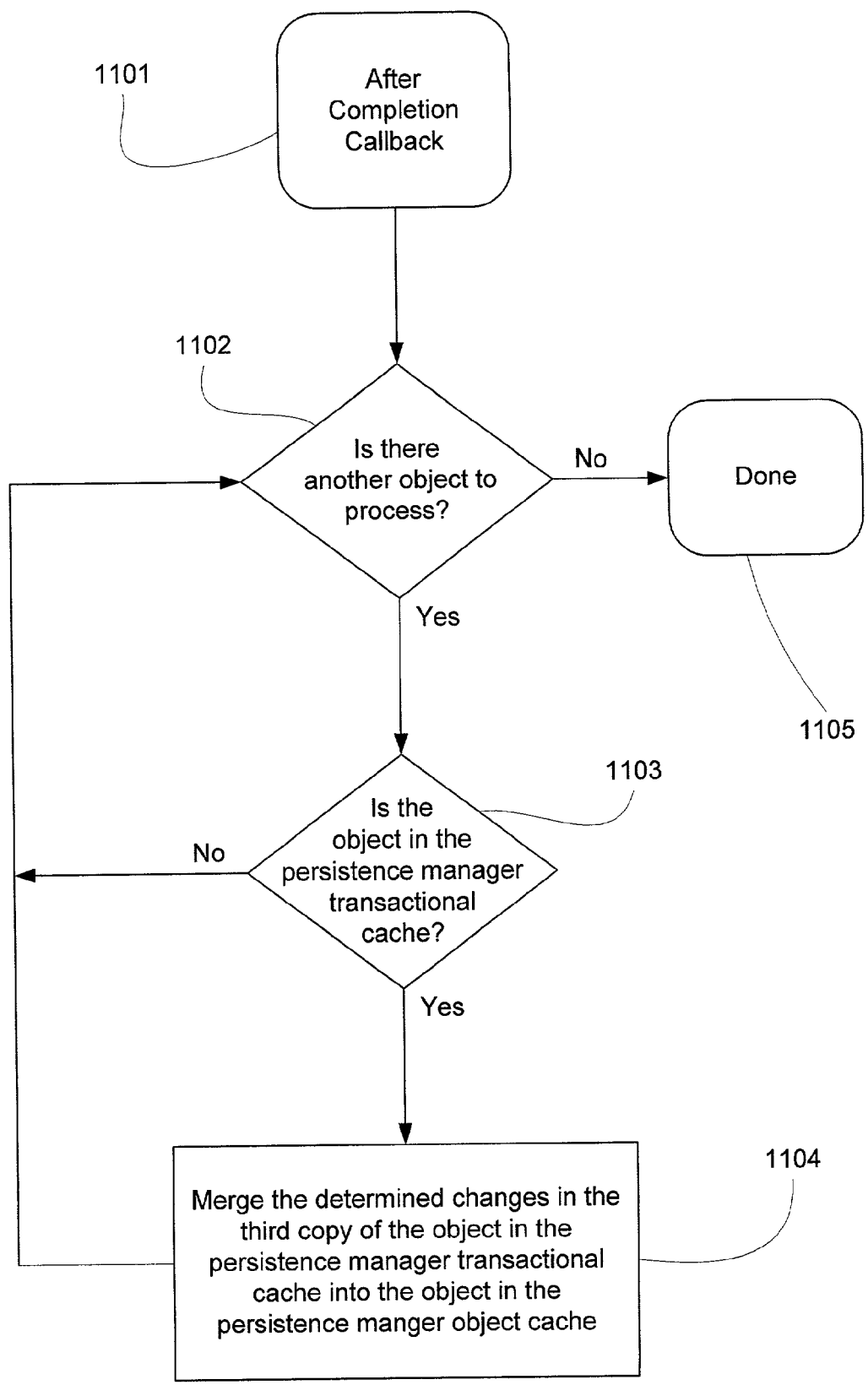
FIG. 11 is a flowchart of the after completion callback operations performed by the connector.

FIG. 11 summarizes the after completion callback operations which the persistence manager connector 300 oversees after receiving an after completion callback (1101). For each object subject to the after completion callback (1101), the following steps are taken (1102). If the object is in the persistence manager transactional cache 153 (1103), then merge the determined changes in the third copy of the object in the persistence manager transactional cache 153 into the object in the persistence manager object cache 151 (1104). If the object is not in the persistence manager transactional cache 153 (1103), then move on to the next object in the after completion callback (1102). Once each object subject to the after completion callback has been processed (1102), then the after completion callback operations are completed (1105), and the change merging function is also complete (905).

As has been explained, entity beans are persistent and can survive a system failure or shutdown. When a transaction is interrupted (by a system failure or shutdown) or cancelled, a rollback occurs. A rollback may also be user initiated. A rollback returns the object that had been in a transaction context back to its original state. Thus all changes which had occurred prior to the rollback are undone. A rollback may occur up until after completion.

By maintaining its own objects in the persistence manager object cache 151 and the persistence manager transactional cache 153, the persistence manager 150 is able to maintain, cache and track object relationships. Moreover, having its own object caching system allows a persistence manager 150 to provide its regular functionality independent of the server API. Since some servers have minimal caching, and persistence knowledge is used to perform proper object caching, it is an advantage of the present invention that the persistence manager 150 is not dependent on a server's caching system. This is particularly advantageous when a persistence manager 150 provides an advanced caching system. The entity bean life-cycle, complex relationships, inheritance and polymorphism can now be maintained, cached and tracked by the persistence manager 150 independently from the server.

The above embodiments are described using Java technology as an example of an object based technology and language. However, the applicability of the invention is not limited to Java or Java based technologies. The invention may be applied to other object-based languages and technologies, such as those developed by Microsoft Corporation or Hewlett Packard, with or without appropriate modification as necessary or desired, and such application is within the scope of the invention.

The integration of persistent object changes of an persistent object in a first persistent object storage system with a second persistence object storage system of the present invention may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal are also within the scope of the present invention, as well as the hardware, software and the combination thereof.

While specific embodiments of the present invention have been described, various modifications and substitutions may be made to such embodiments. Such modifications and substitutions are within the scope of the present invention, and are intended to be covered by the following claims.

What is claimed is:

1. A computer-implemented method for integrating entity bean object changes occurring to an entity bean object in a container with a persistence manager, the container being capable of issuing notifications of events relating to entity bean objects contained therein, the method comprising steps of:
   receiving, at a notification receiver, from the container a notification of an event relating to an entity bean object in the container;
   setting up, by a second object storage system, a copy of the entity bean object in the persistence manager in response to the notification;
   determining, by the second object storage system, object changes made to the entity bean object in the container using the representation in the persistence manager;
   integrating, by the second object storage system, the determined entity bean object changes with the copy in the persistence manager;
   wherein the persistence manager connector integrates the determined object chances into the second object storage system; and
   maintaining, by a consistency maintaining unit, consistency between the copy of the entity bean object in the persistence manager and the entity bean object in the container.

2. A method for integrating entity bean object changes as in claim 1, wherein the container is an Enterprise JavaBeans (EJB) container.

3. A method for integrating entity bean object changes as in claim 1, wherein the receiving step comprises the step of receiving a callback method associated with the event from the container.

4. A method for integrating entity bean object changes as in claim 1, wherein the setting up step comprises the step of searching for a main copy of the entity bean object in the persistence manager.

5. A method for integrating entity bean object changes as in claim 4, wherein the setting up step further comprises loading a main copy of the object from a database into the persistence manager.

6. A method for integrating entity bean object changes as in claim 5, wherein the integrating step further comprises the step of merging the entity bean object changes into a main copy of the entity bean object in the persistence manager.

7. A method for integrating entity bean object changes as in claim 1, wherein the setting up step includes creating a working copy for maintaining the original state of the entity bean object; and
   the determining step comprises steps of:
      modifying the working copy according to the entity bean object changes in the container; and
      comparing the working copy of the entity bean object and the original state copy of the entity bean object to determine the differences between two copies.

8. A method for integrating entity bean object changes as in claim 7, wherein the determining step further comprises the step of storing the entity bean object changes in a change story copy of the object in the persistence manager.

9. A method for integrating entity bean object changes as in claim 8, where in the integrating step comprises the step of committing the entity bean object changes to a database.

10. A method for integrating entity bean object changes as in claim 1, wherein the receiving step further comprises the step of registering a synchronization event listener with a transaction service of the container.

11. A method for integrating entity bean object changes as in claim 1, further comprising steps of:

Receiving a rollback notification to undo actions in a transaction prior to the notification, the rollback notification being received up until after changes are updated to a database; and undoing the actions.

12. In a computer system, an object change integration system for integrating entity bean object changes occurring to an entity bean object in a container with a persistence manager, the object change integration system comprising:

a notification receiver for receiving from the container a notification of an event relating to an entity bean object in the container;

a representation setter for instructing a second object storage system to set up a copy of the entity bean object in the persistence manager in response to the notification;

a change determination unit for instructing the second object storage system to determine object changes made to the entity bean object in the container using the representation in the persistence manager;

an object change integrator for instructing the second object storage system to integrate the determined entity bean changes with the copy in the persistence manager;

wherein the persistence manager connector integrates the determined object chances into the second object storage system; and a consistency maintaining unit for maintaining consistency between the copy of the entity bean object in the persistence manager and the entity bean object in the container.

13. An entity bean change integration system as in claim 12, wherein the container is an Enterprise JavaBeans (EJB) container.

14. A persistence manager connector in a computer system for integrating entity bean object changes occurring to an entity bean object in a container with a persistence manager, the persistence manager comprising:

a notification receiver for receiving from the container a notification of an event relating to an entity bean object in the container;

a representation setting instructor for instructing a second object storage system to set up a copy of the entity bean object in the persistence manager in response to the notification;

a change determination instructor for instructing the second object storage system to determine object changes made to the entity bean object in the container using the representation in the persistence manager;

an integration instructor for instructing the second object storage system to integrate the determined entity bean changes with the copy in the persistence manager;

wherein the persistence manager connector integrates the determined object chances into the second object storage system; and a consistency maintaining unit for maintaining consistency between the copy of the entity bean object in the persistence manager and the entity bean object in the container.

15. A persistence manager connector as in claim 14, wherein the first object storage system is an Enterprise JavaBeans (EJB) container.

* * * * *

UNITED STATES PATENT AND TRADEMARK OFFICE
CERTIFICATE OF CORRECTION

PATENT NO. : 7,003,776 B2
DATED : February 21, 2006
INVENTOR(S) : James Bryce Sutherland It is certified that error appears in the above-identified patent and that said Letters Patent is hereby corrected as shown below:

<u>Title page,</u>
Item [57], ABSTRACT,
Line 4, delete "systems" and replace with -- system --.

Signed and Sealed this

Twenty-fifth Day of April, 2006

JON W. DUDAS
*Director of the United States Patent and Trademark Office*